Dec. 23, 1947.  J. E. DUBE  2,433,206
AIR CONTROL VALVE
Filed May 11, 1942  3 Sheets-Sheet 1
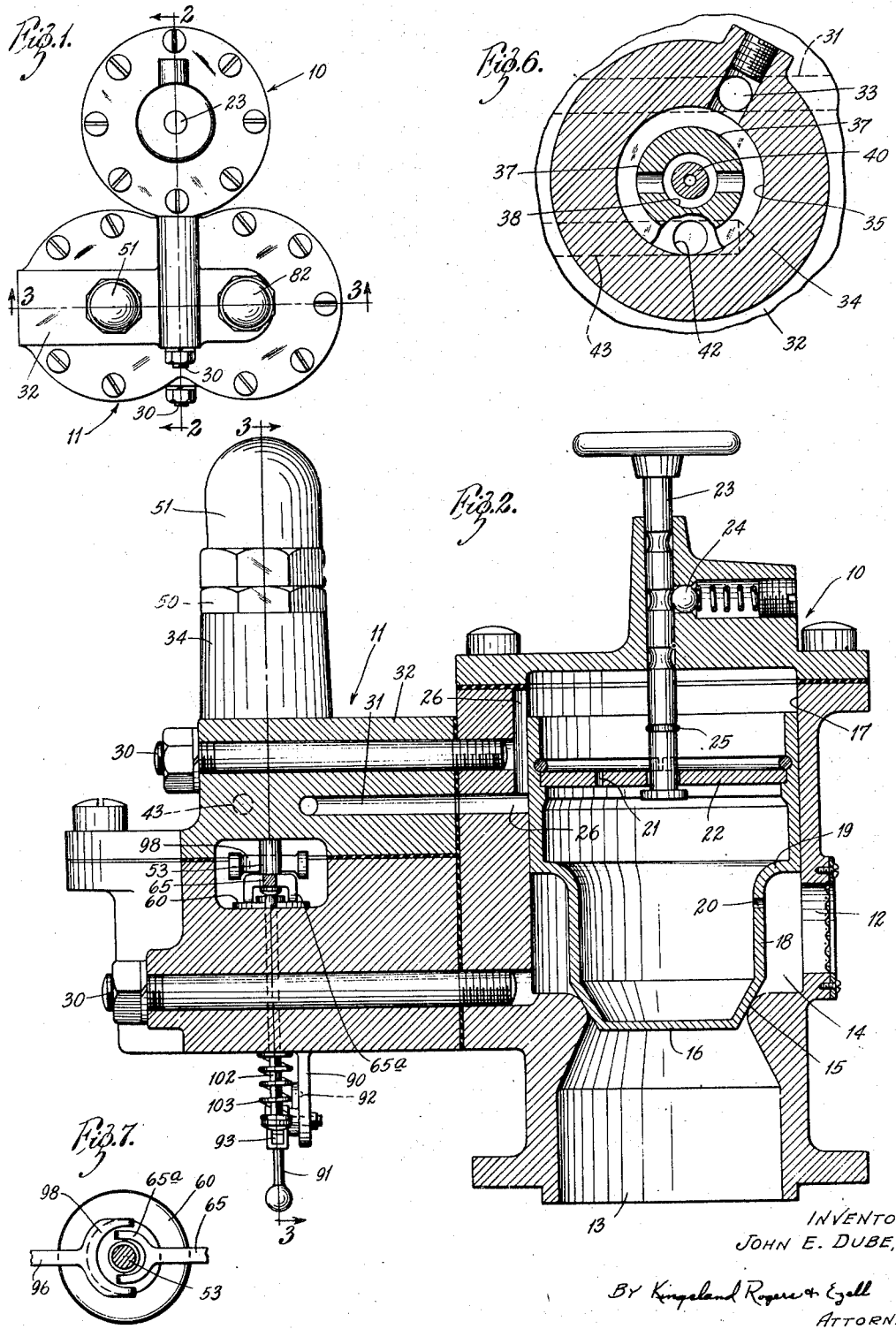
INVENTOR:
JOHN E. DUBE,
BY Kingsland Rogers & Ezell
ATTORNEYS

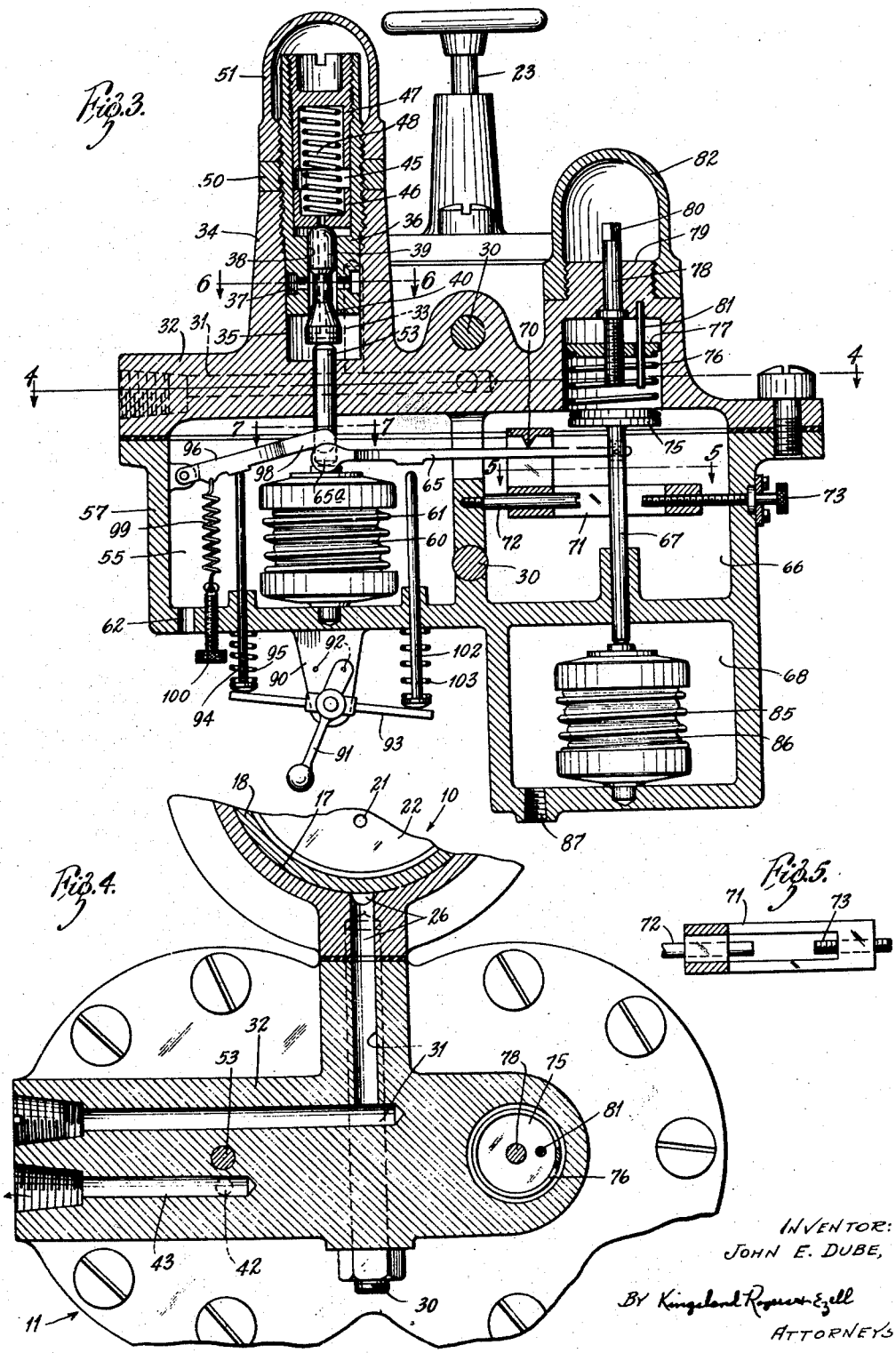

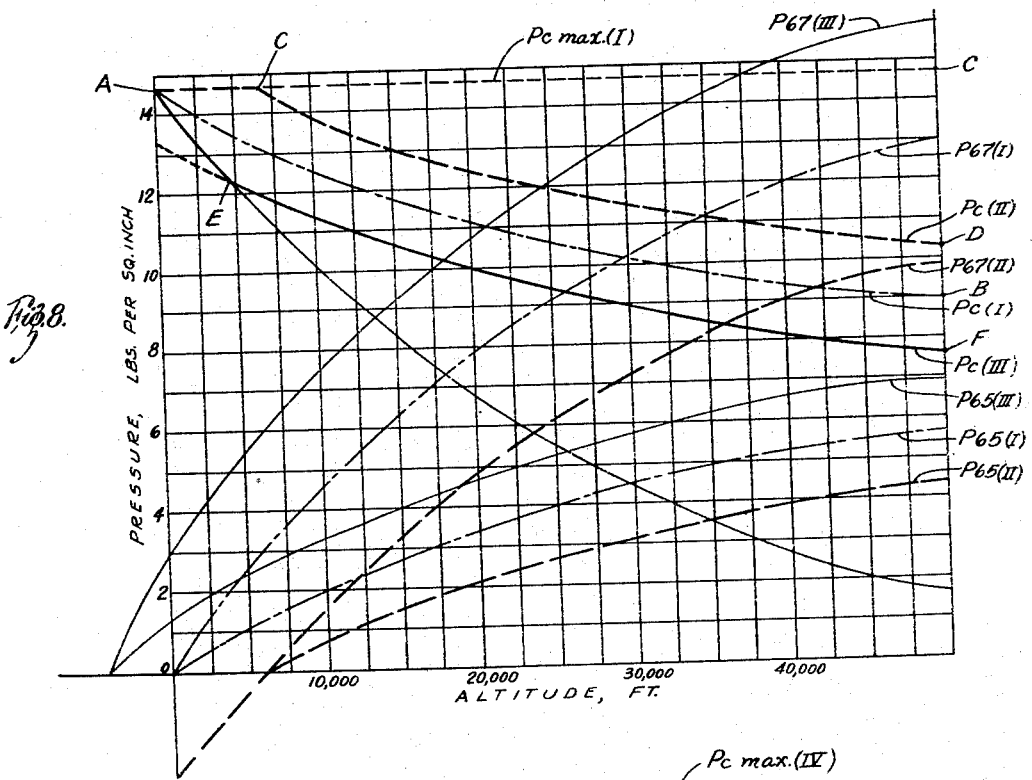
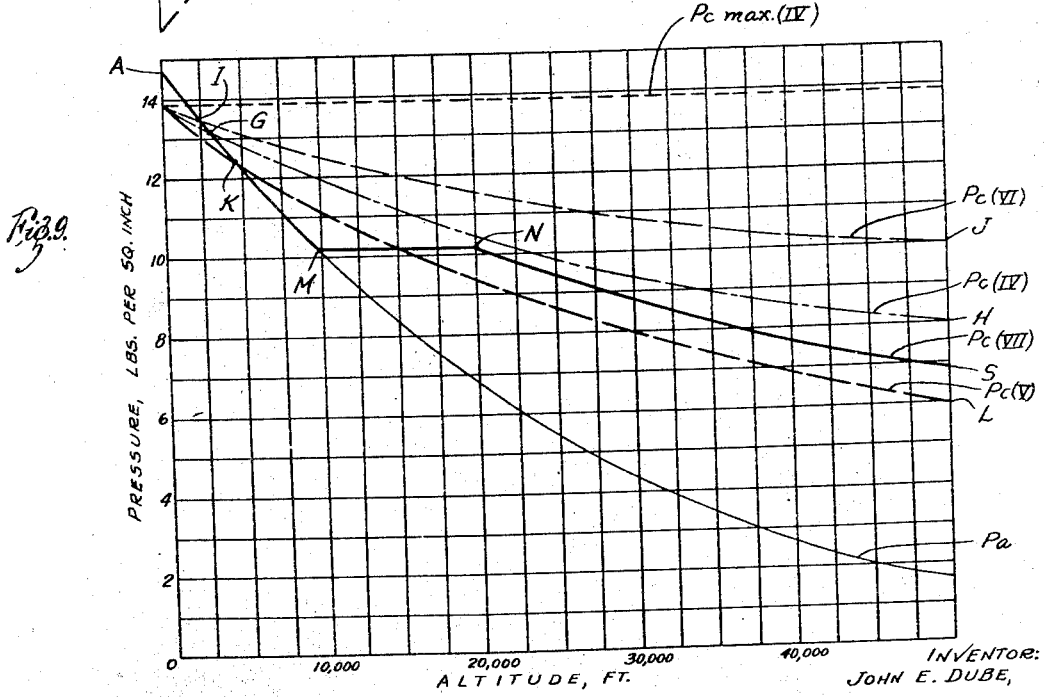

Patented Dec. 23, 1947

2,433,206

UNITED STATES PATENT OFFICE 2,433,206

AIR CONTROL VALVE

John E. Dube, St. Louis County, Mo., assignor to Alco Valve Company, Maplewood, Mo., a corporation of Missouri Application May 11, 1942, Serial No. 442,507

14 Claims. (Cl. 98—1.5)

This invention relates to a pressure control. Since it has peculiar advantages in connection with the control of air pressures within the cabins of aircraft, its object and purposes may be described with reference to that application, although its broader uses will be self-evident upon a study of the description to follow.

In brief, the invention comprises a valve for controlling the flow of air from an aircraft cabin, to be used with a supercharger, and having a pilot valve responsive to changes in pressures both within and without the cabin to control the main valve, and, hence, to maintain the pressures within the cabin at desired points suitable for given conditions.

Broadly, the objects of the invention include providing a control of the foregoing type that will maintain the pressure within an aircraft cabin at suitable values while maintaining the pressure differential between inside and outside pressures within predetermined limits, and within the resisting strength of the cabin walls.

More specific objects include providing in a control of this type, automatically operable means to obtain a pressure condition at which the cabin may be maintained during the first part of the ascent of the plane, with means to provide a maximum amount of pressure difference between the cabin and the atmosphere as the plane further ascends.

A further object is to provide a control to maintain the pressure in the cabin greater than atmospheric pressure as the plane ascends, and varying with atmospheric pressure, but at a different and adjustable rate of change.

Further objects include the provision of means readily operable to render cabin pressure subject only to limitation of its maximum value; or stated differently, to render ineffective at will the parts of the mechanism responsive to atmosphere pressure.

Specifically, the objects of the invention include provision of means movable in response to atmospheric pressure changes, means movable in response to cabin pressure changes, means to integrate both sets of changes and apply their resultant to the control of a master valve within the cabin and which determines the actual pressure within the cabin, with adjustments of the various elements to produce results that will appear from the description to follow.

In the drawings:

Fig. 1 is a plan view of a mechanism suitable for the purposes of this invention;

Fig. 2 is a vertical section on the line 2—2 of Fig. 1;

Fig. 3 is a vertical section on the line 3—3 of Figs. 1 and 2;

Fig. 4 is a horizontal section partly broken away taken on the line 4—4 across the middle of Fig. 3;

Fig. 5 is a horizontal section of a part of the adjusting mechanism taken on the line 5—5 just below the middle at the right of Fig. 3;

Fig. 6 is a horizontal section taken on the line 6—6 across the upper left portion of Fig. 3;

Fig. 7 is a section on the line 7—7 at the left and just below the middle of Fig. 3;

Fig. 8 is a chart showing certain pressure variations involved in the use of this instrument; and, Fig. 9 is an additional chart similar to Fig. 8.

The mechanism as is shown in Fig. 1 includes a main valve device 10 and a pilot control device 11. The main valve is adapted to be disposed on the wall of an airplane cabin so as to have an inlet 12 open to the interior of the cabin and an outlet 13 open to or connected with the atmosphere outside the cabin. Between the inlet 12 and the outlet 13 there is a chamber 14 having a valve seat 15 therein, which receives a valve 16 to close communication between the cabin and the atmosphere.

The valve 16 is in the shape of a piston and fits loosely for vertical movement within a cylinder 17 provided in the valve housing. The valve is provided with a lower narrower portion 18 which contains the portion seating upon the valve seat 15, and which also provides an annular shoulder 19, which shoulder is located so as to be quickly responsive to changes in pressure within the cabin. A port 20 may be provided to admit cabin pressure to the inside of the valve 16, if the loose fit between the valve and the cylinder be found insufficient to that end. There is another port 21 across a plate 22 that encloses the top of the valve. The port 21 admits the passage of air under pressure from within the valve 16 to the upper cylinder.

A handle 23 with a detent mechanism 24 may be employed to provide manual operation of the valve toward closing position. In the position of the handle shown, the valve will be automatically operated. If the handle is depressed to the upper notch, the valve will be held closed by the ring 25. If the handle is lifted to the lower notch, the valve will be held open. A relief passage 26 leading to the edge of the main valve housing from the upper cylinder is provided and it ultimately communicates with the pilot valve as will be described.

The main valve 16 ordinarily has cabin pressure acting at all parts except for the bottom part below the seat 15, which is subjected to atmospheric pressure, usually lower than cabin pressure. If, under usual conditions when a cabin pressure exceeds atmospheric pressure, the pressure within the valve 16 and above the same is opened to atmosphere through the passage 26, cabin pressure acting upon the shoulder 19 will lift the valve to open it, as the air is supplied above the valve at a slower rate than it may exhaust through passage 26.

Control of the exhaust from the passage 26 is effected through the pilot valve 11. This pilot valve is preferably made separate from the main valve so that it can be located at any suitable point about the aircraft. It is here shown as attached directly to the main valve 10 by bolts 30.

As appears in Figs. 2 and 4, the passage 26 registers with a passage 31 within the upper part 32 of the pilot valve housing. The port 31 is angular to have a portion extending transversely across the top of the pilot valve structure. The port 31, in turn, communicates with a vertical port 33 (Figs. 3 and 6), within an upstanding boss 34 formed as a part of the upper part 32 of the pilot valve housing. This portion 34 has a vertical cylindrical opening 35 extending down from the top thereof and into which the vertical port 33 communicates as shown in Fig. 6. A valve seat member 36 is screwed into the opening 35. It has an annular groove 37 around it in a position to register with the outlet of the port 33. The member 36 likewise has a vertical cylindrical opening 38 to receive a slidable valve 39 with a balancing port extending from end to end thereof. The opening 38 communicates with the annular groove 37. The opening 38 likewise provides a valve seat at its bottom part with which a lower tapered part 40 of the valve member 39 is adapted to register to control communication between the port 33 and the bottom part of the cylindrical opening 35.

The cylindrical opening 35 at its bottom has an exhaust port 42 communicating with a horizontal exhaust port 43 (Fig. 6) adapted to receive a connection to atmosphere.

The member 36 has within it an additional cylindrical opening 45 receiving a pair of spring holding members 46 and 47 that contain a spring 48 opposing closing of the valve 40.

The member 36 may be threaded a suitable distance into the boss 34 and held there by a lock nut 50. This adjustment controls the relative positions of the valve 40 and its control mechanism, which will be described. A cover cap 51 encloses the upper part of the member 36.

A plunger 53 is adapted to reciprocate within the upper portion 32 of the valve housing and to operate the valve 40 upwardly. The plunger 53 extends below the upper portion 32 and into a chamber 55 provided within the lower portion 57 of the valve housing. The plunger 53 preferably has a sealing relationship with the upper portion 32.

The plunger 53 is actuated upwardly by the top of an evacuated bellows 60, normally urged upwardly by a spring 61. The bellows 60 is within the chamber 55, which chamber is subjected to cabin pressure through a port 62 either directly open to the cabin or in communication therewith. An increase in cabin pressure, therefore, is transmitted to the chamber 55 wherein it tends to compress the bellows 60 against the spring 61 and to lower the plunger 53, which then permits the valve 40 to open under the influence of its spring 48.

The bellows 60 is subjected to additional pressures applied through a lever 65 having a forked head 65a engaging the top of the bellows 60 and extending across into a second chamber 66 in the housing 57. In this second chamber 66, the lever 65 is pivotally connected to a vertical plunger 67 guided within the lower walls of the chamber 66 for vertical movement and extending through the lower wall to a third chamber 68.

The lever 65 is provided with a fulcrum 70 mounted upon a fulcrum member 71 that is slidably supported upon a pin 72 secured to a partition wall between the chambers 55 and 66. A screw 73 is rotatably mounted through a side wall of the housing 57 and is prevented from moving axially. It is threaded into the fulcrum member 71 so that, by rotating the screw 73, the fulcrum 70 may be adjusted along the lever 65.

The plunger 67 has a plate 75 at its upper end receiving a spring 76 which is compressed between the disc 75 and the second disc 77 mounted upon a screw 78 rotatably mounted in a boss 79 extending upwardly from the upper section 32 and having a square head 80 to receive a wrench for adjustment. A pin 81 passes through the disc 77 to limit movement of the disc 77 to its axial component. A cover 82 encloses the head 80 of the screw 78.

Thus, it will be seen that the spring 76 urges the right hand end (Fig. 3) of the lever 65 downwardly with a force adjusted by the screw 78. Upward movement of the plunger 67 is produced by a spring 85 acting between the opposed caps of a bellows member 86 within the chamber 68. The chamber 68 has a connection 87 leading to atmosphere. It will be seen that the spring 76 opposes the spring 85, and that as atmospheric pressure decreases within the chamber 68, the spring 85 is rendered more effective since it is less opposed by atmospheric pressure tending to compress the bellows 86.

A selector means is provided to enable an operator to shift control of the cabin pressure to absolute values independent of atmospheric variation. To this end, an ear 90 depends from below the bottom portion 57 of the pilot valve housing. The ear 90 receives pivotally a lever 91 adapted to be held by the detent mechanism 92 in either of two positions. A cross arm 93 is secured to the lever 91. At one end, the cross arm 93 receives the head of a push rod 94 urged against it by a spring 95. The push rod 94 in turn engages a lever 96 pivoted to the housing 57 and having a forked head 98 engageable with the top of the bellows 60. The lever 96 is urged against the bellows by a spring 99 secured to an adjustable screw 100 threaded into the bottom of the housing 57. As shown in Fig. 3, the lever 96 is rendered ineffective because the lever 91 is shifted to hold the lever 96 above and off of the bellows.

The other end of the cross arm 93 receives a similar push rod 102 urged against it by a spring 103. The upper end of the push rod 102 engages the lever 65 and when the lever 91 is shifted to its other position, the lever 65 is lifted from the bellows 60 and the lever 96 is allowed to engage the bellows.

*Operation*

The instrument is particularly adapted for use on aircraft in combination with a supercharger to provide cabin pressures above atmosphere.

It has been heretofore shown that the opening of the main valve 16 is controlled by opening or closing the exhaust port 26, and that this in turn is controlled by opening and closing the pilot valve 40.

The main valve 16 is normally seated by gravity, coupled with the difference in pressure between the cabin and atmosphere applied to the area within the valve seat. When, however, the exhaust port is opened, the main valve 16 will open because of the greater pressure against the annular shoulder 19. When the pilot valve subsequently closes, the cabin pressure may again be built up by the supercharger, to increase the pressure within and above the main valve 16 and cause the same to reclose.

The forces acting upon the pilot valve may be analyzed. In the first place, they comprise directly the pressure of the spring 48 (P48) opposed by the pressure of the plunger 53 (P53). While P48 is adjustable, for any given setting of the nut 50 and the member 36, it is a constant.

P53 is made up of several forces. In the first place, it includes a component produced by the spring 61 (P61) which is always upwardly and opposed to P48. Cabin pressure (Pc) acts to collapse the bellows 60 and, therefore, acts in opposition to P61.

In addition to the foregoing forces, which are coaxial, forces (P65) may be applied to plunger 53 from the lever 65 (P65), which include forces from the spring 76 (P76) and from the spring 85 (P85). Since there is a rigid connection through the plunger 67 between the spring 76 and the spring 85, P67 may be taken as a direct resultant of the forces of the opposing springs and of atmosphere. P67 is useful in only one direction, which is upwardly in Fig. 3, and which as P65, becomes downwardly against expansion of the bellows 60 and, hence, in opposition to P61 and accumulative with Pc. P67 differs from P65 because it is subjected to a leverage ratio (R) determined by adjustment of the fulcrum 70. Of course, this leverage ratio remains constant for any single setting of the screw 73.

P67 comprises a balance between P76, P85, and atmosphere pressure (Pa). P85 acts in opposition to Pa, which varies, and P76, which is adjustable. Of course, P76 is normally not changed after a desired value is set upon it.

Since P65 acts only in a direction against P61, and never augments P61, bellows 60 maintains a constant cabin pressure Pc, determined by the springs 48 and 61, but subject to reduction upon increase in P65. P65, in turn, increases with decrease in atmosphere, so that Pc will be reduced upon decrease in Pa, and will be increased upon increase in Pa until it reaches the constant determined by the setting of P48 and P61. P65 has a value determined by the setting of the spring 76, and the position of the fulcrum 70.

First, considering absolute pressure control by bellows 60, assuming Pc is a desired constant, and assuming throughout these discussions that bellows area is unity, the following forces must be in equilibrium:

(1) $P61 = P48 - Pc$ max., or (2) $Pc$ max. $= P61 - P48$, where Pc max. is the maximum cabin pressure that can be obtained by the supercharger under control of this instrument. Pc may exceed Pc max. when Pa does.

For any given adjustment:

(3) $P61 - P48 = C$ (P48 is always a constant; adjustment of $P61 - P48$ is made by adjusting P48), and (4) $Pc$ max. $= C$.

The significance of the above may be read upon the accompanying curve (Fig. 8), wherein $P61 - P48$ are set at atmospheric sea level pressure, giving a Pc max. of 14.7 #/sq. in. abs. This line A—C—C gives a datum line from which may be determined other cabin pressures, less than C because influenced by P65.

It is to be understood that Pc max. may be made any desired pressure by adjustment of P48.

As noted, Pc max. is subject to reduction (only) by P65, and P65 varies inversely with Pa. Analyzing P65, (5) $P65 = R \times P67$ (6) $P67 = P85 - P76 - Pa$, for any given setting $P85 - P76 = C1$ (P85 always being constant, so adjustment of C1 is obtained by adjusting P76), so (7) $P67 = C1 - Pa$ Thus P67 consists of a certain datum line pressure C1, determined by the setting of P76, from which Pa is subtracted. As Pa decreases for increasing altitude, P67 increases for increasing altitude, and comprises an inversion of Pa originating at $P85 - P76$.

(8) $P65 = R(C1 - Pa) = RC1 - RPa$

While P67 under certain conditions might be considered as a negative force, i. e., a force acting downwardly on the shaft 67, this condition is of no consequence because, when P67 is translated into P65, it has significance only as a force in opposition to P61, because there is no mechanical means provided for transmission of an upward P65. (A collar on plunger 53 would be required.) We may neglect conditions, or settings, wherein C1 is less than Pa.

P65 will become a significant force when $C1 - Pa$ becomes greater than zero, as then P65 is positive and acts downward on the bellows 60, opposing P61. $C1 - Pa$ increases with increase in altitude, as Pa decreases, so that there will be a certain altitude at which P65 will be a significant force reducing Pc below the Pc max. line. Hence (9) $Pc = Pc$ max. $-$ (any $P65 > 0$)

For illustrative purposes, certain values may be assumed. As Example I, assume $Pc(I)$ max. $= 14.7$/sq. in abs.

This will be plotted as the horizontal line A—C—C across the top of the Fig. 8 chart, and represents the maximum cabin pressure (neglecting the slight overage required to effect operation of the mechanism).

Assume $C1(I) = P85 - P76 = 14.7\#$/sq. in. Then from (7), $P67(I) = C1 - Pa = 14.7\#$/sq. in. $- Pa$, so that the P67(I) curve at sea level starts at 0, and is a direct inversion of the atmospheric curve Pa. And from (5) $P65(I) = R(I)P67(I)$; so assuming that $R(I) < 1:1$, $P65(I)$ will comprise a curve having the same origin as the P67(I) curve but increasing in such wise as to remain smaller but in constant ratio to P67(I). The P65(I) curve starts at 0—0 and increases with increase in altitude.

Now since any positive P65 force reduces Pc in Equation 9 $Pc = Pc$ max. $- P65$, the Pc(I) curve is a direct inversion of the P65(I) curve, but started at Pc max. and zero altitude.

The foregoing shows that with Pc max. and C1, both at $14.7\#$/sq. in., cabin pressure will start at sea level atmosphere at sea level altitude, and will decrease with increase in altitude in amount below sea level pressure equal to the leverage ratio times atmospheric pressure.

*Example II.*—Assume P76(II) has been increased so that $P85 - P76 = 11.6\#$/sq. in. $= C1(II)$, the other factors remaining the same.

From (7), $P67(II) = C1(II) - Pa = 11.6\# - Pa$, which gives a negative P67 at sea level, $= 11.6\# - 14.7\# = -3.1\#/\text{sq. in.}$ The P67(II) curve will change from negative to positive when Pa equals $P85 - P76$ by becoming $11.6\#/\text{sq. in.}$, which is approximately at 6250 ft. The P67(II) curve, however, will remain an inversion of the Pa curve, but originating at a different point.

From (9), $Pc(II) = Pc\,\text{max.} - (\text{any}\,P65 > 0)$, and any $P65 > 0$, will be the P65(II) curve from 6250 ft. altitude up. And Pc(II) will be Pc max.—0 up to 6250 ft. altitude. Thereafter it will be a curve parallel to Pc(I), gradually reducing to a predetermined minimum, or it will, in short, be curve A—C—D.

*Example III.*—Assume P76 has been reduced so that C1(III) is greater than $14.7\#/\text{sq. in.}$, such as $17.7\#/\text{sq. in.}$ From (7) $P67(III) = C1(III) - Pa = 17.7\# - Pa$, giving a positive P67(III) of $3\#/\text{sq. in.}$ at sea level.

From (5) $P65 = RP67$, so P65(III) will be positive, but less than P67(III), at sea level and will continue to increase with increasing altitude.

As P65(III) is always positive, from (9) $Pc(III) = Pc\,\text{max.} - P65(III)$ so Pc(III) would be less than sea level pressure at sea level. Pressures within and without the cabin would equalize until Pc(III) changed from below to above atmospheric pressure. Hence Pc(III) will follow Pa to the point E, the intersection of Pc(III) and Pa, and thereafter Pc(III) will decrease with Pa but at a lower rate, giving the curve A—E—F.

*Example IV (Fig. 9).*—Assume $P48 - P61 = Pc$ max. has been reduced to below atmosphere, as $13.85\#/\text{sq. in.}$, equal to approximately 1500' altitude, other adjustables remaining constant at values in Example I. Then Pc(IV) max. will be a horizontal line at $13.85\#/\text{sq. in.}$, except that Pc(IV) max. will not go below Pa. So Pc(IV) max. will follow Pa to where $Pa = 13.85\#/\text{sq. in.}$, and then will be constant.

$$Pc(IV) = Pc(IV)\,\text{max.} - P65.$$

From Example I, P67 is an inversion of Pa, and P65 is a curve originating with P67 but smaller in values. Theoretically Pc(IV) would then be an inversion of P65 beginning at $13.85\#/\text{sq. in.}$ But since Pc is never less than Pa, the actual Pc(IV) curve follows Pa to point G, then follows the inversion of P65, giving curve A—G—H.

*Example V.*—Assume R increases (pivot 70 moves to left) every other adjustable remaining as in Example IV. This merely changes the slope of the P65 curve, its origin remaining the same. P65 becomes greater, and Pc(V) is, after zero altitude, continuously less than Pc(IV). Since Pc is never less than Pa, Pc(V) will be curve A—K—L, the said K—L being P65(V) inverted.

*Example VI.*—Similarly to Example V, a reduction in R produces a Pc(VI) curve A—I—J.

*Example VII.*—To illustrate the uses of the instrument assume it is desired to have Pc follow atmosphere to 10,000 ft., there to remain constant to 20,000 ft., and thereafter to decrease upon further decrease of atmosphere, maintaining a determined pressure ratio between Pc and Pa.

First, P48 is adjusted so Pc max.(VII) is Pa (10,000) or about $10.15\#/\text{sq. in.}$ (assuming unity for bellows area). Then set P76(VII) at $7.8\#$ equal to $14.7 - Pa\,(20,000')$, (assuming P85 is fixed at $14.7\#$). This gives P67(VII) of $-7.8\#$ at sea level, and $0\#$ at 20,000'. P65(VII) as a positive force then begins at 20,000'. Then the knob 73 is adjusted to give the desired ratio of decline of Pc relative to Pa reduction. This may be controlled by the maximum permissible pressure difference between cabin and atmosphere. The position of the knob and pivot are calculated by obtaining the difference in Pa and Pc max. at some high altitude, the ceiling if the Pc max. is critical, and then calculating the ratio between that pressure and the P67 for the chosen altitude, setting the fulcrum to obtain the ratio. The P67 can always be determined by subtracting Pa at the chosen high altitude, and P76, from $14.7\#$, the last being the assumed value of P85. Thus in the example chosen, assume the minimum Pc at ceiling altitude, or that the desired Pc-Pa ratio would produce such Pc min., of $7\#/\text{sq. in.}$ The P67 at 50,000' ceiling equals $14.7\# - 7.8\# - 1.7\# = 5.2\#$. The difference between Pc max. and Pa at 50,000' is $8.45\#/\text{sq. in.}$ The ratio between $$P67\,(50,000)\,\text{and}\,8.45\# = \frac{5.2}{8.45} = .604$$

Applying this ratio to the pivot—the pivot being .604 of the distance from bellows 60 to rod 67—it will be found that Pc will follow the desired path of reduction. A graph of this appears in Fig. 9 at A—M—N—S.

When it is desired to operate the aircraft with a predetermined Pc max., regardless of external pressure change, the lever 91 is shifted, raising the lever 65 from the bellows 60, and adding the spring 99 to Pc acting to open the valve. This P99 may be adjusted to a desired value, but at any value it is merely cumulative with P48 in establishing the Pc max.

As suggested in the first paragraph of the specification, this control is of particular value in connection with maintaining aircraft cabins at desirable pressures. However, it is fairly obvious that it could be used to control the pressure conditions between the inside and the outside of any container or chamber.

It is also obvious that the starting pressure within the cabin may be higher than atmospheric pressure. Almost any aircraft may land at a port at an altitude greater than the one from which the datum pressure value was selected. In such case, the cabin will rapidly assume a pressure higher than atmospheric pressure whenever the cabin is closed. Of course, the pressure may be higher than the datum value if the mechanism is so set, as it may be, if desired.

What is claimed:

1. In a mechanism of the kind described for use in varying the pressure in a chamber in response to a varying external pressure, means operable in response to external pressure to produce a first force varying inversely as external pressure, means responsive to internal pressure to produce a second force varying inversely as internal pressure, control means for the chamber to be actuated in two directions, means to apply the second force to the actuated means to displace it in one direction, means to apply the first force in opposition to the second force to resist such displacement of the actuated means, and means enabling said second force applying means to effect actuation of the actuated means in the other direction upon increase in internal pressure regardless of the condition of external pressure.

2. In a mechanism of the kind described for control of pressure conditions within a container subjected to varying external pressure conditions, a pair of pressure-responsive force producing means, the first force producing means being subjected to one of said pressure conditions, the second force producing means being subjected to the other of said pressure conditions, force applying means including leverage mechanism to apply the force of the second force producing means to oppose the force of the first, to obtain a resultant force from both means, and means to adjust the leverage of the force applying means to alter the proportion of the force of the second force producing means that is applied against the first, and mechanism comprising means operated by said resultant force for controlling the flow of pressure medium between the interior and exterior of the container.

3. In a mechanism of the kind described to control pressures in a cabin with external pressures reducing from a starting pressure, a first collapsible means subjected to cabin pressure, a second collapsible means subjected to external pressure, means applying a force to each collapsible means in opposition to the collapsing internal and external forces, means to adjust both of said opposition forces, mechanism including a flow control device to be actuated in response to said forces, said mechanism being adapted to control flow of pressure medium between the interior and exterior of the cabin, and means to apply said forces to said device.

4. In a mechanism of the kind described to control internal pressures in a cabin with external pressures reducing from a starting pressure, a first collapsible means subjected to internal pressures, a second collapsible means subjected to external pressures, means applying a force to each collapsible means in opposition to the internal or external pressure, means for adjusting the opposition force on the second collapsible means, means to apply a force proportional to the net second force to the first collapsible means, means to adjust the proportion of the force thus applied, a valve to control flow of pressure medium between the interior and exterior of the cabin, a valve actuating means, and means to apply the resultant of said forces to the valve actuating means.

5. In a mechanism of the kind described, a housing, a valve therein, actuating means for the valve, a first collapsible means in the housing and subjected to a first pressure, spring means opposing said first pressure to resist collapse, additional adjustable spring means opposing said first spring means, a lever to receive the resultant force of said collapsible means and springs, a second collapsible means in the housing subjected to a second pressure, spring means opposing said pressure, said lever being adapted to apply its resultant force against the spring means of the second collapsible means, an adjustable fulcrum on the housing for said lever, and means applying an overall resultant of the forces produced aforesaid to the valve actuating means.

6. In a mechanism of the kind described for controlling pressures within a container subject to varying external pressures, a valve for controlling the flow of a pressure medium between the interior and the exterior of the container, control means for the valve including a first and second pressure-responsive means subjected respectively to interior and exterior pressures, additional means to apply a predetermined force to the interior pressure-responsive means, and means selectively to engage the exterior pressure-responsive means and the predetermined force means to the first pressure-responsive means.

7. In a mechanism of the kind described for use in producing predetermined pressures within a container during variation in pressures outside the same, a first fluid pressure responsive means, a second fluid pressure responsive means, said first fluid pressure responsive means being subjected to internal pressures and displaceable in response to changes therein, the second fluid pressure responsive means being subjected to external pressures and displaceable in response to changes therein, a valve for controlling flow of fluid between the inside and outside of the container, means connecting the valve and the first fluid pressure responsive means to cause the valve to operate when internal pressure applied to the first fluid pressure responsive means exceeds a predetermined value, and second means connecting the second fluid pressure responsive means to act against the first fluid pressure responsive means to reduce said predetermined value when external pressure is reduced below a predetermined value, said second fluid pressure responsive means and said second connecting means being adapted to apply reducing force that increases with decrease in external pressure.

8. In a mechanism of the kind described for use in producing predetermined pressures within a container during variation in pressures outside the same, a first fluid pressure responsive means, a second fluid pressure responsive means, said first fluid pressure responsive means being subjected to internal pressures and displaceable in response to changes therein, the second fluid pressure responsive means being subjected to external pressures and displaceable in response to changes therein, a valve for controlling flow of fluid between the inside and outside of the container, means connecting the valve and the first fluid pressure responsive means to cause the valve to operate when internal pressure applied to the first fluid pressure responsive means exceeds a predetermined value, and second means connecting the second fluid pressure responsive means to act against the first fluid pressure responsive means to reduce said predetermined value when external pressure is reduced below a predetermined value, said second fluid pressure responsive means and said second connecting means being adapted to apply reducing force that increases with decrease in external pressure, said second connecting means including mechanism to change the reducing force applied from the second fluid pressure responsive means to cause the internal pressure determined by the first fluid pressure responsive means to be reduced in proportion to reduction in external pressure, at ratios less than the absolute reduction in external pressure.

9. In a mechanism of the kind described for use in producing predetermined pressures within a container during variation in pressures outside the same, a first fluid pressure responsive means, a second fluid pressure responsive means, said first fluid pressure responsive means being subjected to internal pressures and displaceable in response to changes therein, the second fluid pressure responsive means being subjected to external pressures and displaceable in response to changes therein, a valve for controlling flow of fluid between the inside and outside of the container, means connecting the valve and the first fluid pressure responsive means to cause the valve to operate when internal pressure applied to the first fluid pressure responsive means exceeds a predetermined value, and second means connecting the second fluid pressure responsive means to act against the first fluid pressure responsive means to reduce said predetermined value when external pressure is reduced below a predetermined value, said second fluid pressure responsive means and said second connecting means being adapted to apply reducing force that increases with decrease in external pressure, said second connecting means including a lever for transmitting force of the second fluid pressure responsive means to reduce the operating pressure of the first fluid pressure responsive means, and a fulcrum for said lever to reduce the ratio of said reduction.

10. In a mechanism of the kind described for use in providing predetermined fluid pressures within a container during variation in pressures outside the same, a first chamber connected to the inside of the container, a second chamber connected to the outside of the container, a first pressure responsive means in the first chamber movable in response to variations in internal pressure and producing a force varying with said internal pressure, a second pressure responsive means in the second chamber movable in response to variation in external pressure and producing a force varying with said external pressure, means displaced by movement of the first pressure responsive means, a linkage displaced by the second pressure means and acting on the means displaced by the first pressure responsive means in opposition to the first pressure responsive means to effect a resultant force below that of the first pressure responsive means, said linkage being adapted to change the ratio of displacing force applied by the second pressure responsive means to the said displaced means, and a valve operated from the displaced means in accordance with a resultant displacement derived from both pressure responsive means, said valve being adapted to control flow of fluid from the container.

11. In a mechanism of the kind described for use in providing predetermined fluid pressures within a container during variation in pressures outside the same, mechanism including a valve for controlling flow of fluid between the container and the outside, pressure-responsive means responsive to internal pressures including a movable member subjected to a predetermined force on one side and to internal pressure on the other, whereby the member moves in response to changes in internal pressure, means connecting the member to the valve to operate the valve when internal pressure exceeds a predetermined amount, to maintain a predetermined internal maximum pressure when external pressure is below said value, a second pressure-responsive means responsive to external pressure, said means comprising a member movable in response to variations in external pressures, and means connecting said last-named member with the first pressure-responsive member to act in the same direction as internal pressure to operate the valve, whereby said pressure-responsive member responsive to external pressure acts to reduce the maximum pressure upon reduction of external pressure below a predetermined value, and means to render the second pressure-responsive means inoperative to affect said valve.

12. In a mechanism of the kind described for use in providing predetermined fluid pressures within a container during variation in pressures outside the same, a first chamber connected to the inside of the container, a second chamber connected to the outside of the chamber, a first pressure responsive means adapted to exert a force and within the first chamber to be subjected to the opposing force of inside pressure, means to adjust the force exerted by the first pressure responsive means, a second pressure responsive means in the second chamber, and adapted to exert a force and opposed by external pressure, means to adjust the force exerted by the second pressure responsive means, means to apply the net force of the second pressure responsive means to the first pressure responsive means in opposition to the force thereof, a valve controlling the flow of fluid between the container and the outside, and means applying the resultant force of both pressure responsive means to the valve to operate the same.

13. In a mechanism of the kind described for use in producing predetermined pressures within a container during variation in pressures outside the same, a first fluid pressure-responsive means, a second fluid pressure-responsive means, said first fluid pressure-responsive means being subjected to internal pressures and displaceable in response to changes therein, the second fluid pressure-responsive means being subjected to external pressures and displaceable in response to changes therein, mechanism including means for controlling flow of fluid between the inside and outside of the container, means connecting the flow-controlling means and the first fluid pressure-responsive means to cause the flow-controlling means to operate to automatically diminish internal pressure when internal pressure applied to the first fluid pressure-responsive means exceeds a predetermined value, and second means connecting the second fluid pressure-responsive means to act against the first fluid pressure-responsive means to reduce said predetermined value when external pressure is reduced below a predetermined value, said second fluid pressure-responsive means and said second connecting means being adapted to apply reducing force that increases with decrease in external pressure.

14. In a mechanism of the kind described for use in producing predetermined pressures within a container during variation in pressures outside the same, a first fluid pressure-responsive means, a second fluid pressure-responsive means, said first fluid pressure-responsive means being subjected to internal pressures and displaceable in response to changes therein, the second fluid pressure-responsive means being subjected to external pressures and displaceable in response to changes therein, mechanism including means for controlling flow of fluid between the inside and outside of the container, means connecting the flow-controlling means and the first fluid pressure-responsive means to cause the flow-controlling means to operate to automatically diminish internal pressure when internal pressure applied to the first fluid pressure-responsive means exceeds a predetermined value, and second means connecting the second fluid pressure-responsive means to act against the first fluid pressure-responsive means to reduce said predetermined value when external pressure is reduced below a predetermined value, said second fluid pressure-responsive means and said second connecting means being adapted to apply reducing force that increases with decrease in external pressure, said second connecting means being incapable of acting with said first fluid pressure-responsive means to increase said predetermined value above the maximum provided by said first fluid pressure-responsive means.

JOHN E. DUBE.

(References on following page)

REFERENCES CITED

The following references are of record in the file of this patent:

UNITED STATES PATENTS

| Number | Name | Date |
|---|---|---|
| 2,002,057 | Gregg | May 21, 1935 |
| 2,119,402 | Puffer | May 31, 1938 |
| 2,181,199 | Otterson | Nov. 28, 1939 |
| 2,194,749 | Gregg | Mar. 26, 1940 |
| 2,208,554 | Price | July 16, 1940 |
| 2,265,461 | Wagner | Dec. 9, 1941 |
| 2,284,984 | Nixon et al. | June 2, 1942 |
| 2,289,639 | Fausek et al. | July 14, 1942 |
| 2,307,199 | Cooper | Jan. 5, 1943 |
| 2,316,416 | Gregg | Apr. 13, 1943 |

FOREIGN PATENTS

| Number | Country | Date |
|---|---|---|
| 521,623 | Great Britain | May 27, 1940 |
| 679,386 | France | Jan. 9, 1930 |

OTHER REFERENCES

Article by H. E. W. Tinker and H. S. Hubbard in "Aviation," January 1941; pp. 38, 119, 124.